(12) United States Patent
Echeverry et al.

(10) Patent No.: US 7,927,637 B2
(45) Date of Patent: Apr. 19, 2011

(54) **BLUE COLORANT DERIVED FROM *GENIPA AMERICANA* FRUIT**

(75) Inventors: Luis Fernando Echeverry, Medellin (CO); Sandra Patricia Zapata, Medellin (CO); Luis Fernando Torres, Medellin (CO)

(73) Assignee: Ecoflora SA, Carmen de Viboral, Antioquia (CO)

( * ) Notice: Subject to any disclaimer, the term of this patent is extended or adjusted under 35 U.S.C. 154(b) by 271 days.

(21) Appl. No.: 12/245,367

(22) Filed: Oct. 3, 2008

(65) Prior Publication Data

US 2010/0083448 A1    Apr. 8, 2010

(51) Int. Cl.
*A61K 36/00* (2006.01)

(52) U.S. Cl. ......................... 424/777; 424/725

(58) Field of Classification Search ............ None
See application file for complete search history.

(56) References Cited

U.S. PATENT DOCUMENTS

| | | | | |
|---|---|---|---|---|
| 4,247,698 A | * | 1/1981 | Toyama et al. | 546/112 |
| 4,878,921 A | * | 11/1989 | Koga et al. | 8/646 |
| 7,279,189 B2 | * | 10/2007 | Lauro | 426/250 |
| 7,649,014 B2 | * | 1/2010 | Zhang et al. | 514/455 |
| 2005/0008746 A1 | * | 1/2005 | Beck et al. | 426/540 |
| 2008/0260668 A1 | * | 10/2008 | Vidalenc | 424/63 |
| 2009/0223000 A1 | * | 9/2009 | Ferreira | 8/439 |
| 2009/0246343 A1 | * | 10/2009 | Wu et al. | 426/540 |

FOREIGN PATENT DOCUMENTS

| | | | |
|---|---|---|---|
| JP | 55164625 | * | 12/1980 |
| JP | 61047167 | * | 3/1986 |
| JP | 01022820 | * | 1/1989 |
| JP | 05339134 | * | 12/1993 |
| JP | 07310023 | * | 11/1995 |
| JP | 08301739 | * | 11/1996 |

OTHER PUBLICATIONS

Pino Chala et al. Acto Biologica Colombiana. 2003. vol. 8, No. 2, pp. 95-98, BIOSIS Abstract enclosed.*

* cited by examiner

*Primary Examiner* — Christopher R. Tate
(74) *Attorney, Agent, or Firm* — John J. Martinez; Martinez Patents PC

(57) ABSTRACT

The present invention provides a method to make a blue colorant as a liquid and as a powder, wherein the blue colorant is derived from unprocessed raw juice obtained from *Genipa americana* fruit pulp, and wherein said raw juice is mixed with glycine (liquid) or with glycine plus starch (powder). Except for an additional step of warming up the juice-glycine mix, and in the case of the powder further dehydration of the juice-glycine-starch remix, no further steps are required to make a temperature and PH stable blue colorant which may be applied in textile, pharmaceutical, food, cosmetics, and other industries.

13 Claims, 15 Drawing Sheets

BLUE COLORANT DERIVED FROM *GENIPA AMERICANA* FRUIT

FIELD OF THE INVENTION

The present invention relates to a method to make a colorant using raw liquid juice obtained from *Genipa americana* fruit pulp.

DESCRIPTION OF PRIOR ART

Synthetic colorants tend to be disfavored nowadays because of side effects, e.g., carcinogenic. Food, cosmetic and textile industries are tending to use natural or organic colorants.

Safe colorants derived from extracted components from plants have been described. In JP Patent Publications No. 52053932A2 and No. 52053934A2, H. Okuyama et al. describes a blue-violet colorant made of an spontaneous reaction of compounds bearing primary amino groups and genipin or analogs (extracted from *Gardenia jasminoides*) after treatment with glucosidase. Similarly, K. Kunimasa, et al. in U.S. Pat. No. 4,878,921, describes a blue colorant made of taurine that reacts with genipin, wherein the genipin have been extracted from *Gardenia jasminoides* by the hydrolysis of iridoid glycoside geniposide under action of glugosidase. In both of these cases the extraction from *Gardenia jasminoides* of genipin requires hydrolysis treatment of geniposide with glucosidase.

Colorants derived from raw components obtained after a complex process from *Genipa americana* (a Latin American different variant of the *Gardenia jasminoides* family) have been described for non permanent tattoo applications. An example is PCT Publication No. WO05105020A2 by D. Vidalenc. Vidalenc describes a method for obtaining a natural dye using raw components from *Genipa americana*, wherein obtaining the raw components involved freezing and unfreezing the *Genipa americana* fruit, extracting juice from said fruit, treating the juice with nitrogen bubbles, mixing the treated juice with rosemary, oily extracts, and color increasing components selected from soy amino acids, hydrolyzed soy, arginine, phenylalanine, methionine, lysine, bromeline, BHT, and BHA.

However, there is no description of an stable, broad range of applications, blue colorant derived from unprocessed raw components obtained from *Genipa americana* fruits with a minimum of other added components.

SUMMARY OF THE INVENTION

The present invention provides a method to make a blue colorant as a liquid and as a powder, wherein the blue colorant is derived from unprocessed raw juice obtained from *Genipa americana* fruit pulp, and wherein said raw juice is mixed with glycine (liquid) or with glycine plus starch (powder). Except for an additional step of warming up the juice-glycine mix, and in the case of the powder further dehydration of the juice-glycine-starch remix, no further steps are required to make a temperature and PH stable blue colorant which may be applied in textile, pharmaceutical, food, cosmetics, and other industries.

Specifically, The present invention provides a method of manufacturing a colorant comprising:
  A. Peeling off a *Genipa americana* fruit from its skin, wherein said skin is discarded, and wherein said fruit without skin is *Genipa americana* fruit pulp;
  B. Obtaining raw liquid juice from the *Genipa americana* fruit pulp;
  C. Mixing the raw liquid juice with glycine; and,
  D. Warming up the raw liquid juice mixed with glycine for a determined period of time.

In one aspect of the method of the present invention obtaining the raw liquid juice from the *Genipa americana* skinless fruit further comprises:
  a. Grinding the *Genipa americana* fruit pulp;
  b. Compressing the grinded *Genipa americana* fruit pulp against a mesh, wherein major solids are retained by said mesh, and wherein raw liquid juice goes throughout said mesh.

In another additional aspect of the method of the present invention, mixing the raw liquid juice with glycine comprises mixing at least 0.2 grams of glycine per 100 milliliters of raw liquid juice.

In one more aspect of the method of the present invention, mixing the raw liquid juice with glycine comprises mixing between 0.2 grams and 1.6 grams of glycine per 100 milliliters of raw liquid juice.

In other preferred aspect of the method of the present invention further comprises:
  E. Adding starch to the previously warmed up mix of the raw liquid juice-glycine, and remixing, wherein said remixing results in an raw liquid juice-glycine-starch remix;
  F. Dehydrating the raw liquid juice-glycine-starch remix, wherein dehydrating said remix comprises injecting the remix into a heated chamber by way of an atomizer; wherein the atomizer has the effect of converting the remix into small liquid remix droplets, wherein the chamber heat vaporizes water from said droplets, wherein vaporizing the water from said droplets results in low density particles and high density particles, wherein the high density particles precipitate to the chamber bottom and wherein the low density particles are aspirated with a vacuum, and wherein the aspirated low density particles form dried colorant powder.

In an aspect of another version of the method of the present invention, said method further comprises:
  e. Adding starch to the previously warmed up mix of the raw liquid juice-glycine, and remixing, wherein said remixing results in an raw liquid juice-glycine-starch remix;
  f. Dehydrating by liophilization the raw liquid juice-glycine-starch remix.

The present invention also provides a liquid colorant made of a mix comprising: raw liquid juice obtained from skinless *Genipa americana* fruit pulp, and glycine.

In one aspect of the colorant of the present invention, the mix of raw liquid juice and glycine comprises at least 0.2 grams of glycine per 100 milliliters of raw liquid juice.

In one further aspect of the colorant of the present invention, the mix of raw liquid juice and glycine comprises between 0.2 grams and 1.6 grams of glycine per 100 milliliters of raw liquid juice.

The present invention further provides a powder colorant comprising a dehydrated mix of raw liquid juice obtained from skinless *Genipa americana* fruit pulp, glycine and starch.

In one aspect of the powder colorant of the present invention, the dehydrated mix is derived from a premix of raw liquid juice and glycine, wherein said premix comprises at least 0.2 grams of glycine per 100 milliliters of raw liquid juice.

In another additional aspect of the powder colorant of the present invention, the dehydrated mix is derived from a premix of raw liquid juice and glycine, wherein said premix comprises between 0.2 grams and 1.6 grams of glycine per 100 milliliters of raw liquid juice.

Objectives and additional advantages of the present invention will become more evident in the brief description of the drawings, the detailed description of the invention and the claims.

DETAILED DESCRIPTION OF THE INVENTION

Figure 1:
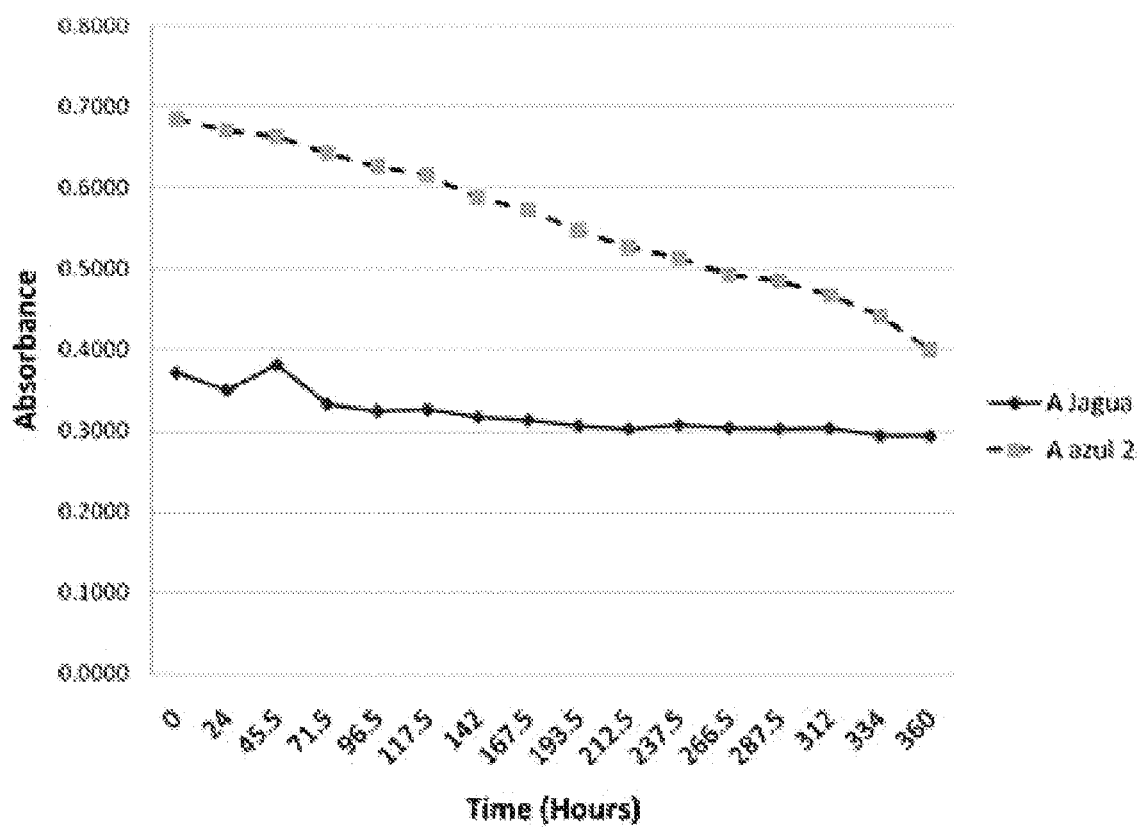
FIG. 1 shows a graphic comparing the absorbance in relation to time of the blue colorant of the present application (A-Jagua), and the absorbance in relation to time of the Blue 2 dye (Azul-2), when the temperature is 6° C. and the pH is 3.

The present invention provides a method of manufacturing a colorant comprising:
G. Peeling off a *Genipa americana* fruit from its skin, wherein said skin is discarded, and wherein said fruit without skin is *Genipa americana* fruit pulp;
H. Obtaining raw liquid juice from the *Genipa americana* fruit pulp;
I. Mixing the raw liquid juice with glycine; and,
J. Warming up the raw liquid juice mixed with glycine for a determined period of time.

For the purpose of the present invention the term "peeling off" means separating the skin from the fruit. In a preferred form, the *Genipa americana* fruit is cut vertically into four parts, and then the fruit pulp is separated from the skin cutting the pulp off from inside of each of the four parts. However any other way of separating the pulp from the skin of the fruit may be used.

For purpose of the present invention, the term "*Genipa americana*" includes all the following:
*Gardenia genipa* Sw.
*Genipa americana*, var. *caruto* fo. *grandifolia*
*Genipa excelsa*
*Genipa americana* var. *Carnuto*
*Genipa barbata*
*Genipa pubescens* DC.
*Genipa humilis*
*Genipa caruto*
*Genipa grandifolia*
*Genipa oblongifolia*

Similarly, for purpose of this invention, the term "*Genipa americana*" also includes as equivalent any of the following popular synonym names:
Irayol (Guatemala);
Maluco (Mexico);
Guaitil (Costa Rica);
(VEN) Caruto;
Caruto, Jagua (Colombia);
Quipará o Quepará (native language of tribe étnia emberá);
Huito (Perú);
Bi (Bolivia);
Genipapo (Brazil).

The step of warming up the raw liquid juice mixed with glycine is performed by preferably heating up the mixed juice and glycine for 2 hours at about 70° C. (centigrade). However warming up at different temperatures will also be appropriate; for example, lower temperatures can be used for longer periods of time, or higher temperatures for shorter periods of time. Acceptable ranges will be between 40° C. to 80° C. for 1 hour to 10 hours.

In one aspect of the method of the present invention obtaining the raw liquid juice from the *Genipa americana* skinless fruit further comprises:

c. Grinding the *Genipa americana* fruit pulp;
d. Compressing the grinded *Genipa americana* fruit pulp against a mesh, wherein major solids are retained by said mesh, and wherein raw liquid juice goes throughout said mesh.

The definition of the term "grinding" for purposes of this invention includes any breaking up or chopping of the pulp into smaller pieces or particles or any process that converts the pulp toward a fully visible liquid status.

In another additional aspect of the method of the present invention, mixing the raw liquid juice with glycine comprises mixing at least 0.2 grams of glycine per 100 milliliters of raw liquid juice.

However in a preferred aspect of the method of the present invention, mixing the raw liquid juice with glycine comprises mixing between 0.2 grams and 1.6 grams of glycine per 100 milliliters of raw liquid juice.

In other preferred aspect of the method of the present invention further comprises:

K. Adding starch to the previously warmed up mix of the raw liquid juice-glycine, and remixing, wherein said remixing results in an raw liquid juice-glycine-starch remix;
L. Dehydrating the raw liquid juice-glycine-starch remix, wherein dehydrating said remix comprises injecting the remix into a heated chamber by way of an atomizer; wherein the atomizer has the effect of converting the remix into small liquid remix droplets, wherein the chamber heat vaporizes water from said droplets, wherein vaporizing the water from said droplets results in low density particles and high density particles, wherein the high density particles precipitate to the chamber bottom and wherein the low density particles are aspirated with a vacuum, and wherein the aspirated low density particles form dried colorant powder;

Wherein adding the starch is an independent step that is performed after juice derived from the *Genipa americana* fruit pulp had been mixed with glycine and after the warmed up juice-glycine mix had cooled down. Preferably, the amount of starch added is in a concentration of about 15-25% of starch in relation to total volume.

In an aspect of another version of the method of the present invention, said method further comprises:

g. Adding starch to the previously warmed up mix of the raw liquid juice-glycine, and remixing, wherein said remixing results in an raw liquid juice-glycine-starch remix;
h. Dehydrating by liophilization the raw liquid juice-glycine-starch remix.

Liophilization techniques are well know in the art of the invention.

The present invention also provides a liquid colorant made of a mix comprising: raw liquid juice obtained from skinless *Genipa americana* fruit pulp, and glycine.

In one aspect of the colorant of the present invention, the mix of raw liquid juice and glycine comprises at least 0.2 grams of glycine per 100 milliliters of raw liquid juice.

In one further aspect of the colorant of the present invention, the mix of raw liquid juice and glycine comprises between 0.2 grams and 1.6 grams of glycine per 100 milliliters of raw liquid juice.

The present invention further provides a powder colorant comprising a dehydrated mix of raw liquid juice obtained from skinless *Genipa americana* fruit pulp, glycine and starch.

In one aspect of the powder colorant of the present invention, the dehydrated mix is derived from a premix of raw liquid juice and glycine, wherein said premix comprises at least 0.2 grams of glycine per 100 milliliters of raw liquid juice.

In another additional aspect of the powder colorant of the present invention, the dehydrated mix is derived from a premix of raw liquid juice and glycine, wherein said premix comprises between 0.2 grams and 1.6 grams of glycine per 100 milliliters of raw liquid juice.

Although the present invention describes a method to make the colorant from the mix of raw liquid juice from *Genipa americana* fruit pulp and glycine, wherein said method allows for the addition of starch and complete dehydration to make colorant powder, the mix of just the juice and glycine can also be made into a further concentrated liquid by partial dehydration without the addition of starch.

While the description presents the preferred embodiments of the present invention, additional changes can be made in the form and disposition of the parts without distancing from the basic ideas and principles comprised in the claims.

EXAMPLES

The liquid colorant of the present invention, which for the purpose of the test was called Jagua (AJagua), was tested for stability in a concentration of 0.01 grams/40 ml and compared with synthetic colorant Blue No.2 (Azul 2) (0.0003 grams/40 ml). Both tested compounds were maintained for 15 days under the following conditions:

6° C. (Centigrade) at pH 3, pH 5, pH 7, pH 9, and pH 7.17
20° C. (Centigrade) at pH 3, pH 5, pH 7, pH 9, and pH 7.17
50° C. (Centigrade) at pH 3, pH 5, pH 7, pH 9, and pH 7.17

Figure 2:
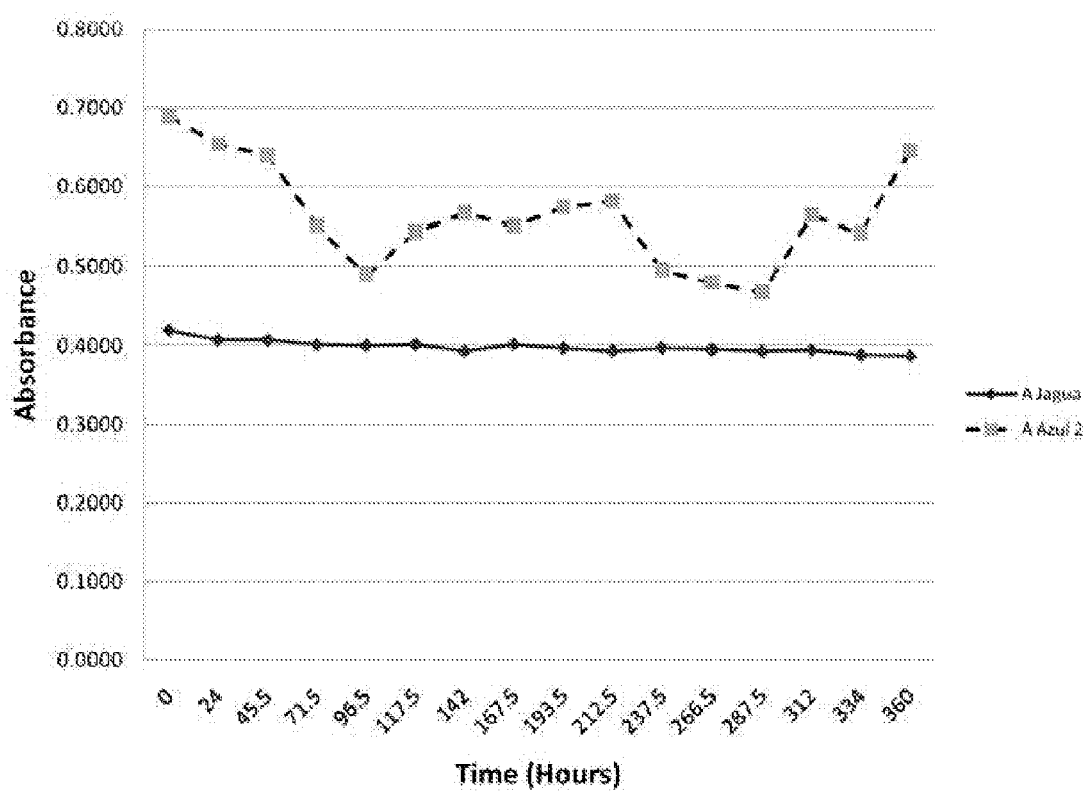
FIG. 2 shows a graphic comparing the absorbance in relation to time of the blue colorant of the present application (A-Jagua), and the absorbance in relation to time of the Blue 2 dye (Azul-2), when the temperature is 6° C. and the pH is 5.
Figure 3:
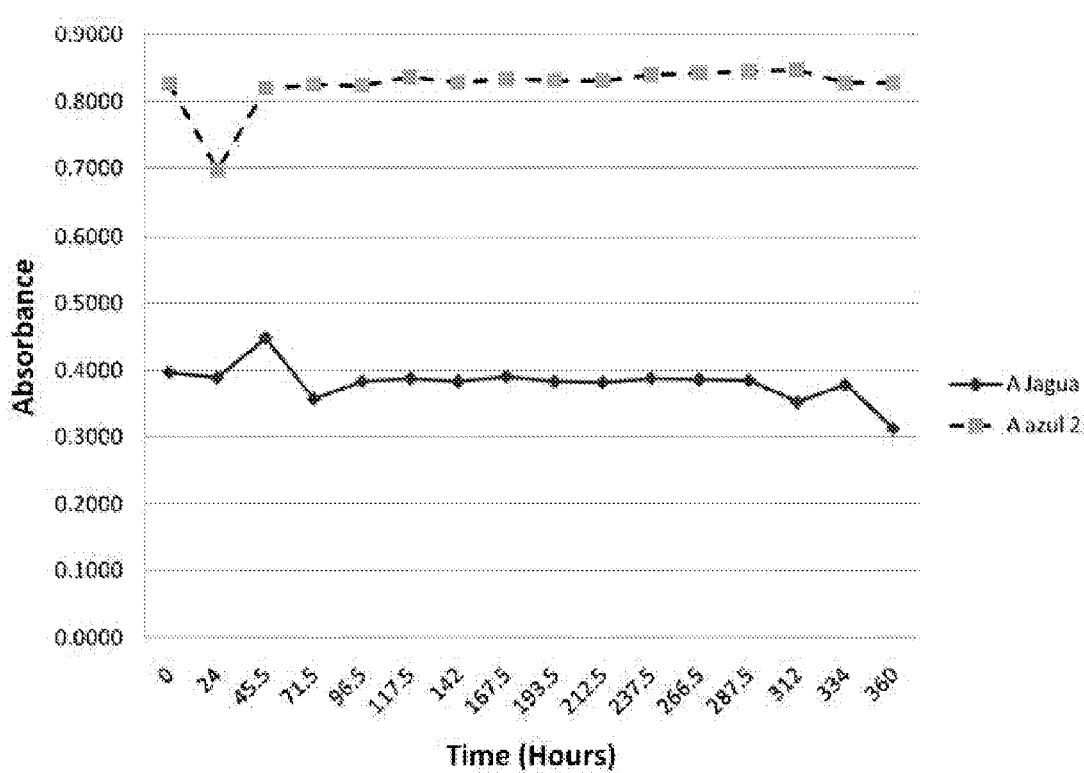
FIG. 3 shows a graphic comparing the absorbance in relation to time of the blue colorant of the present application (A-Jagua), and the absorbance in relation to time of the Blue 2 dye (Azul-2), when the temperature is 6° C. and the pH is 7.
Figure 4:
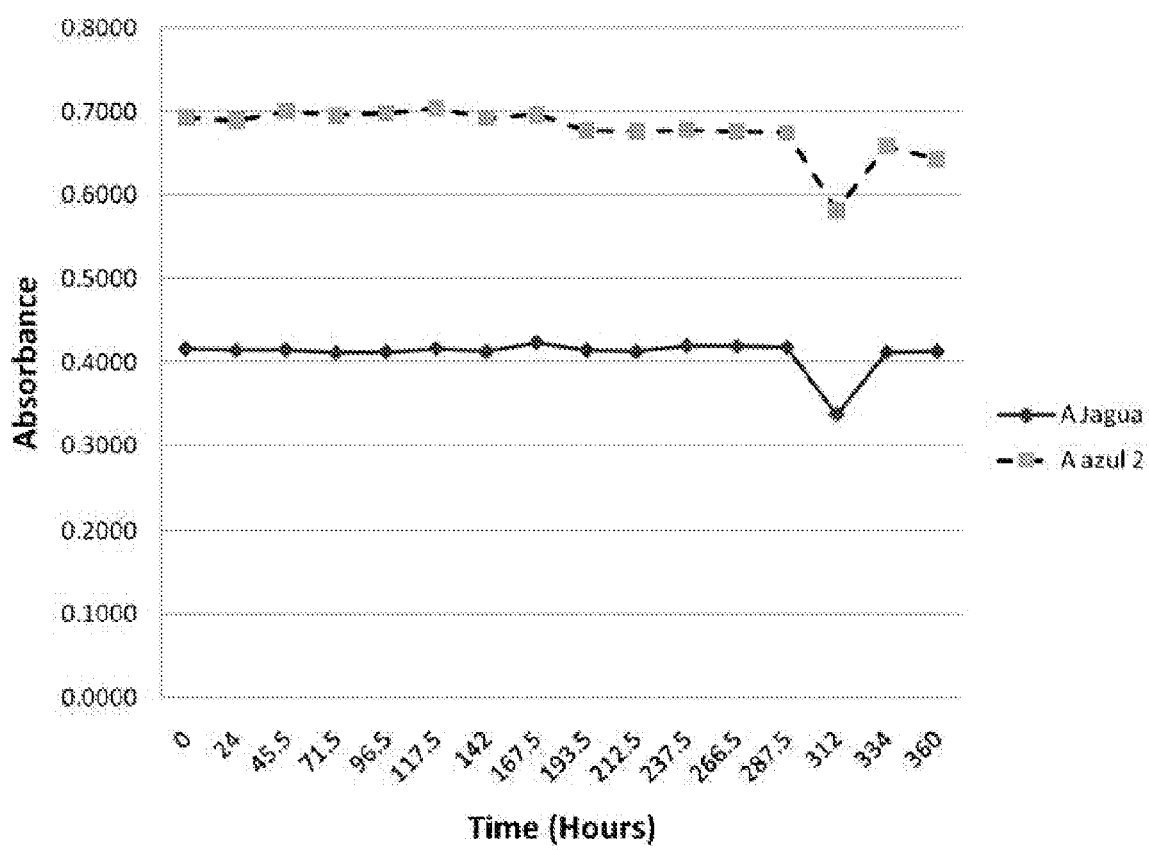
FIG. 4 shows a graphic comparing the absorbance in relation to time of the blue colorant of the present application (A-Jagua), and the absorbance in relation to time of the Blue 2 dye (Azul-2), when the temperature is 6° C. and the pH is 9.
Figure 5:
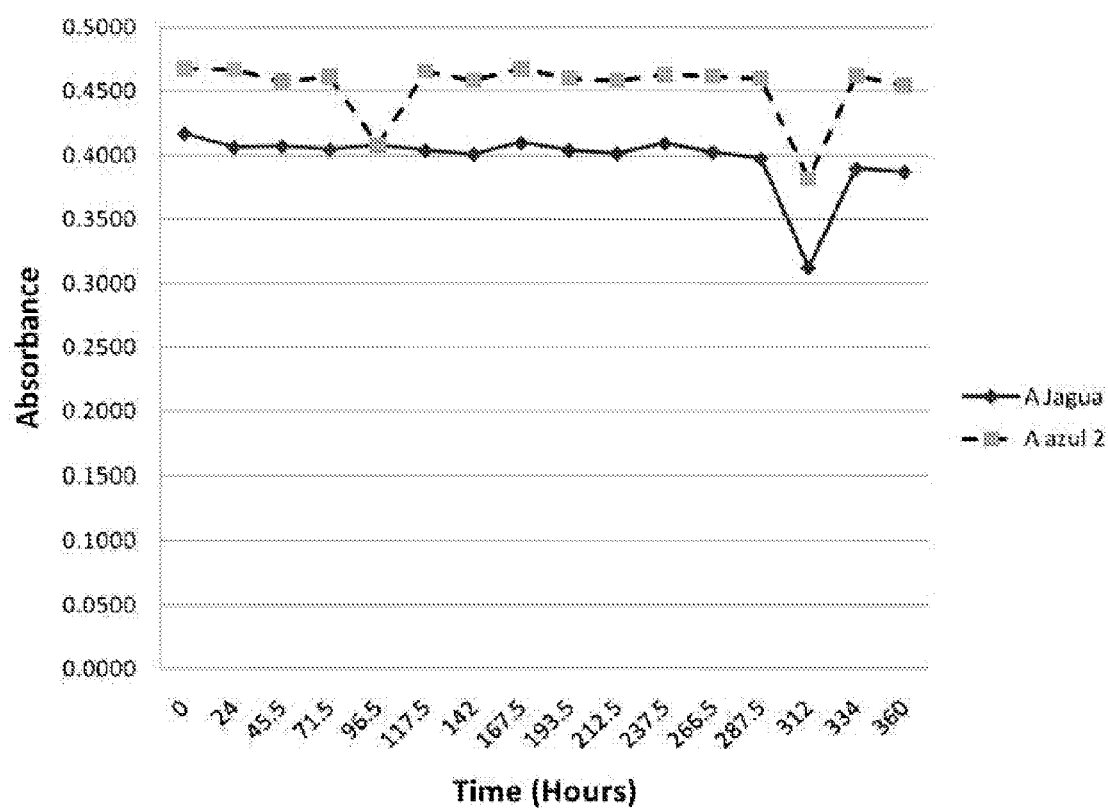
FIG. 5 shows a graphic comparing the absorbance in relation to time of the blue colorant of the present application (A-Jagua), and the absorbance in relation to time of the Blue 2 dye (Azul-2), when the temperature is 6° C. and the pH is 7.17.
Figure 6:
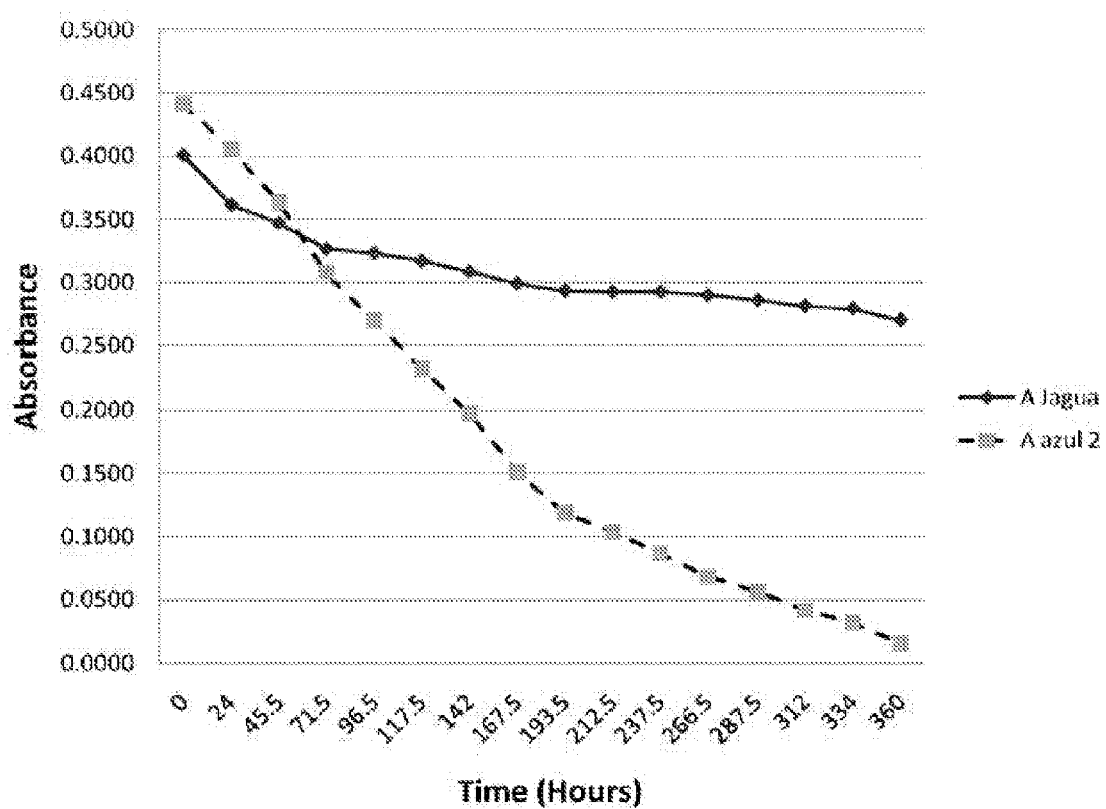
FIG. 6 shows a graphic comparing the absorbance in relation to time of the blue colorant of the present application (A-Jagua), and the absorbance in relation to time of the Blue 2 dye (Azul-2), when the temperature is 20° C. and the pH is 3.
Figure 7:
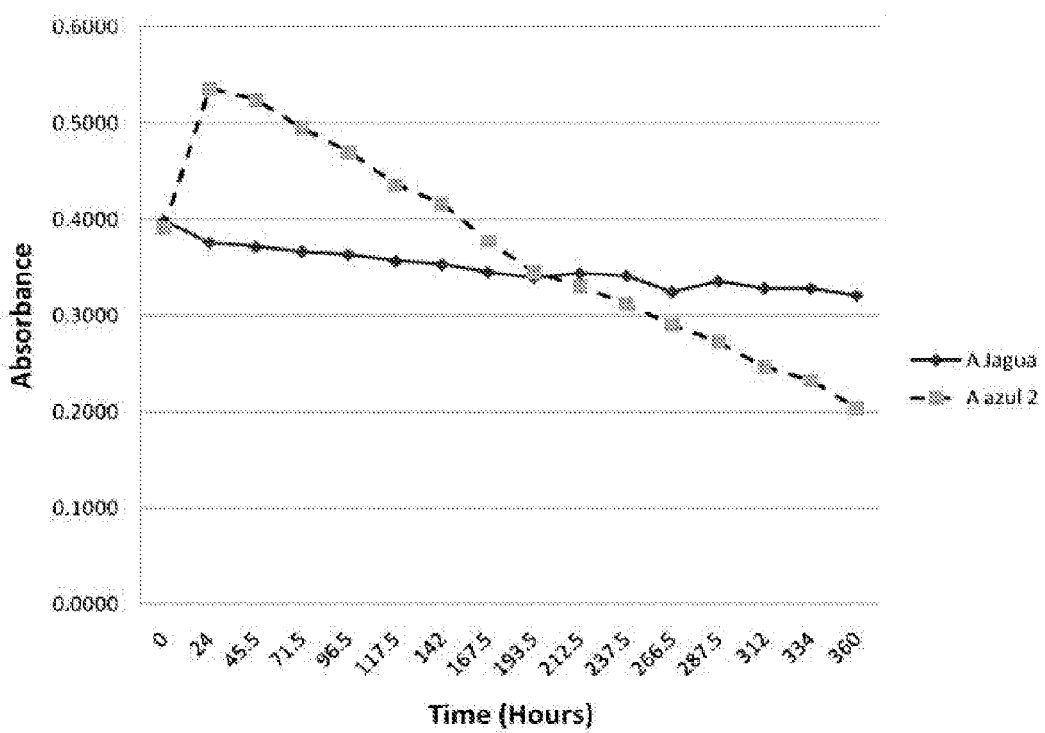
FIG. 7 shows a graphic comparing the absorbance in relation to time of the blue colorant of the present application (A-Jagua), and the absorbance in relation to time of the Blue 2 dye (Azul-2), when the temperature is 20° C. and the pH is 5.
Figure 8:
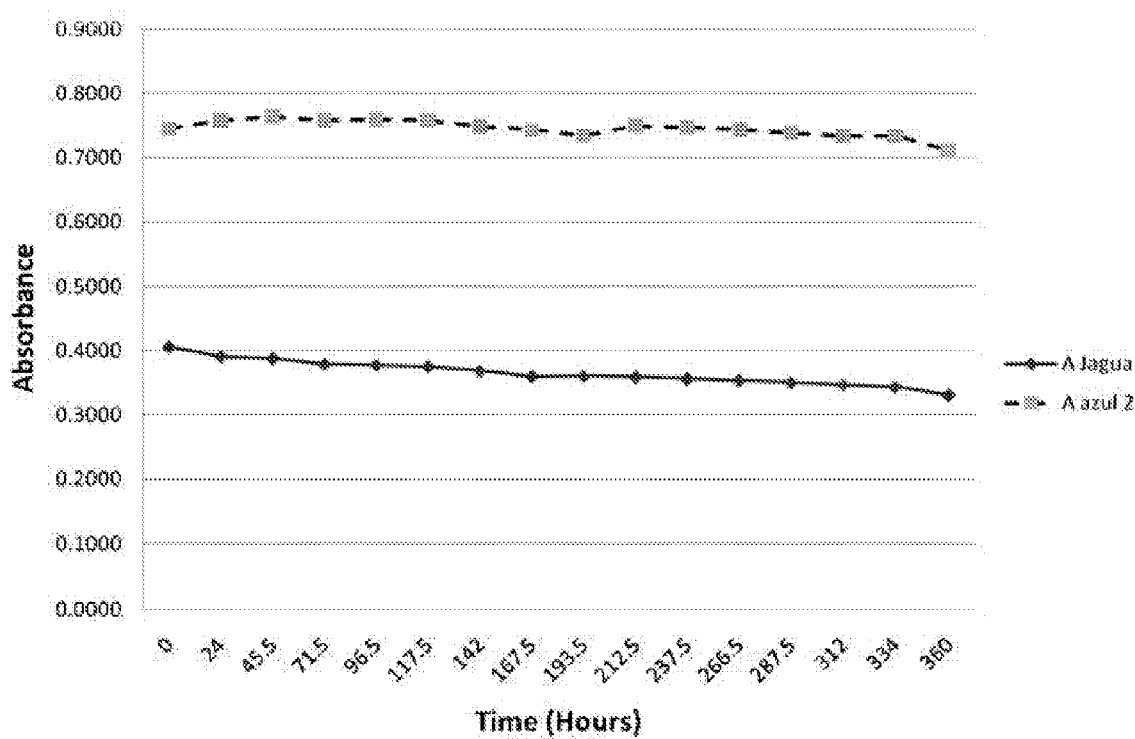
FIG. 8 shows a graphic comparing the absorbance in relation to time of the blue colorant of the present application (A-Jagua), and the absorbance in relation to time of the Blue 2 dye (Azul-2), when the temperature is 20° C. and the pH is 7.
Figure 9:
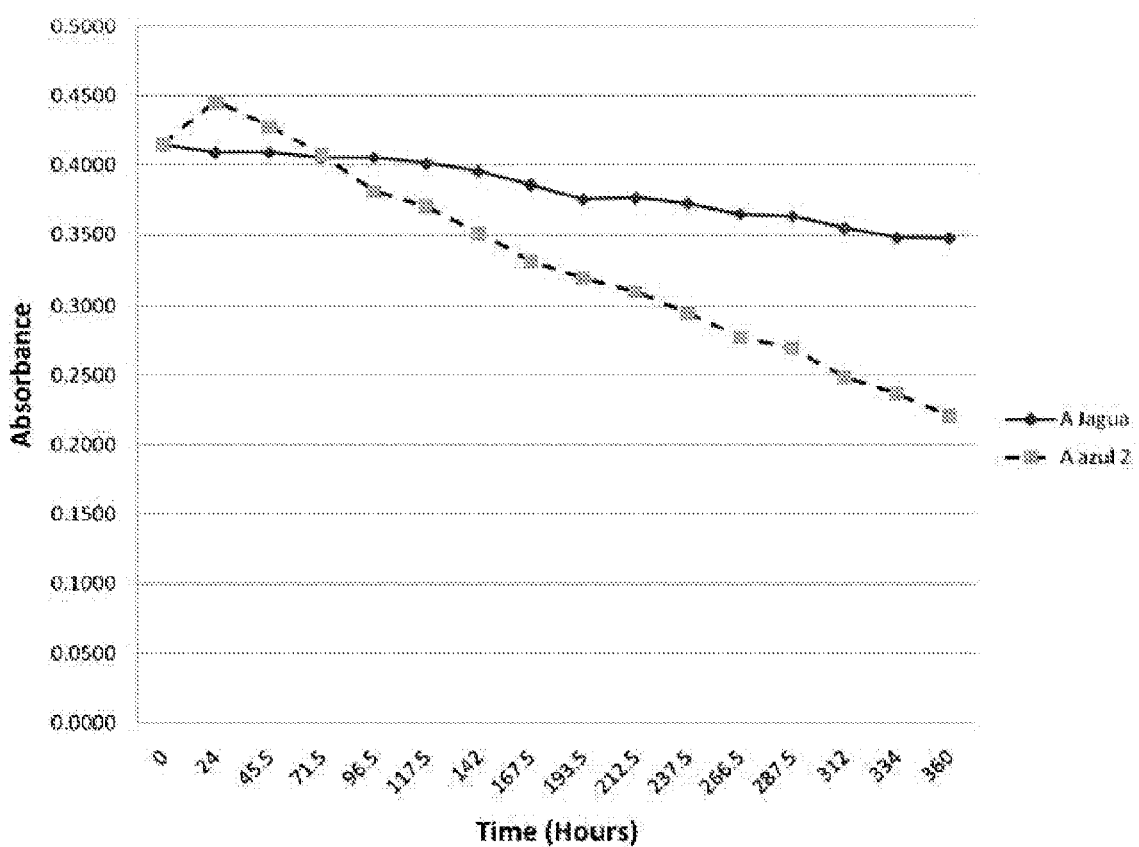
FIG. 9 shows a graphic comparing the absorbance in relation to time of the blue colorant of the present application (A-Jagua), and the absorbance in relation to time of the Blue 2 dye (Azul-2), when the temperature is 20° C. and the pH is 9.
Figure 10:
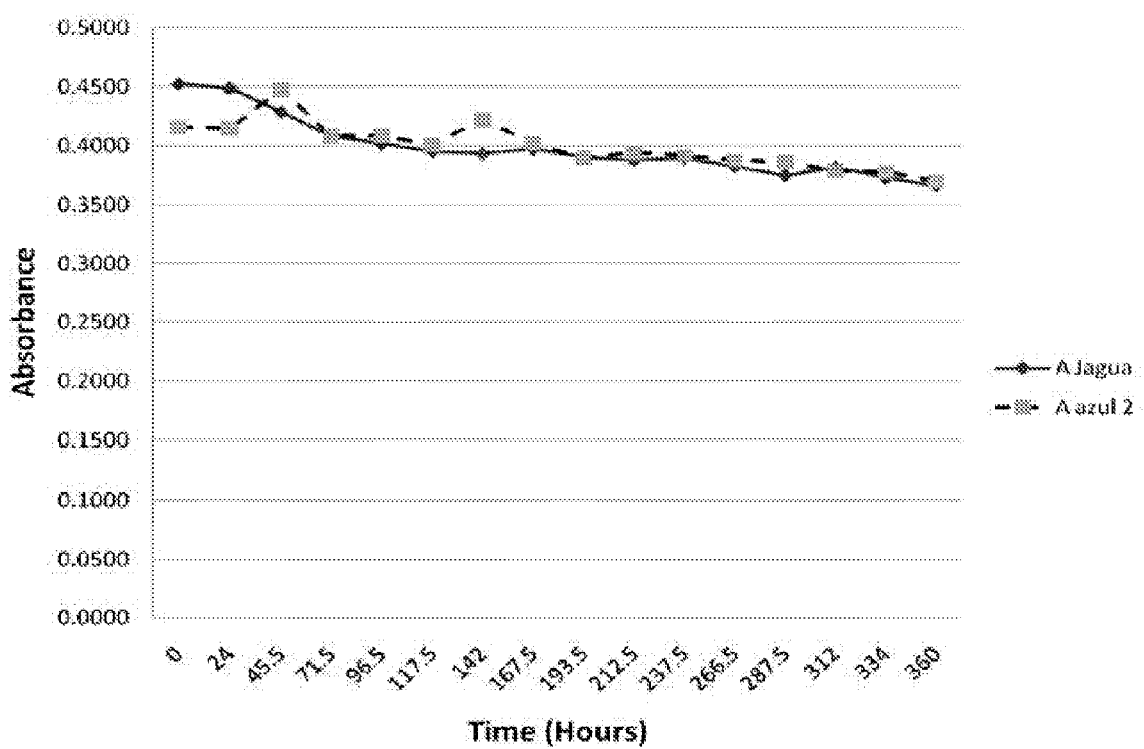
FIG. 10 shows a graphic comparing the absorbance in relation to time of the blue colorant of the present application (A-Jagua), and the absorbance in relation to time of the Blue 2 dye (Azul-2), when the temperature is 20° C. and the pH is 7.17.
Figure 11:
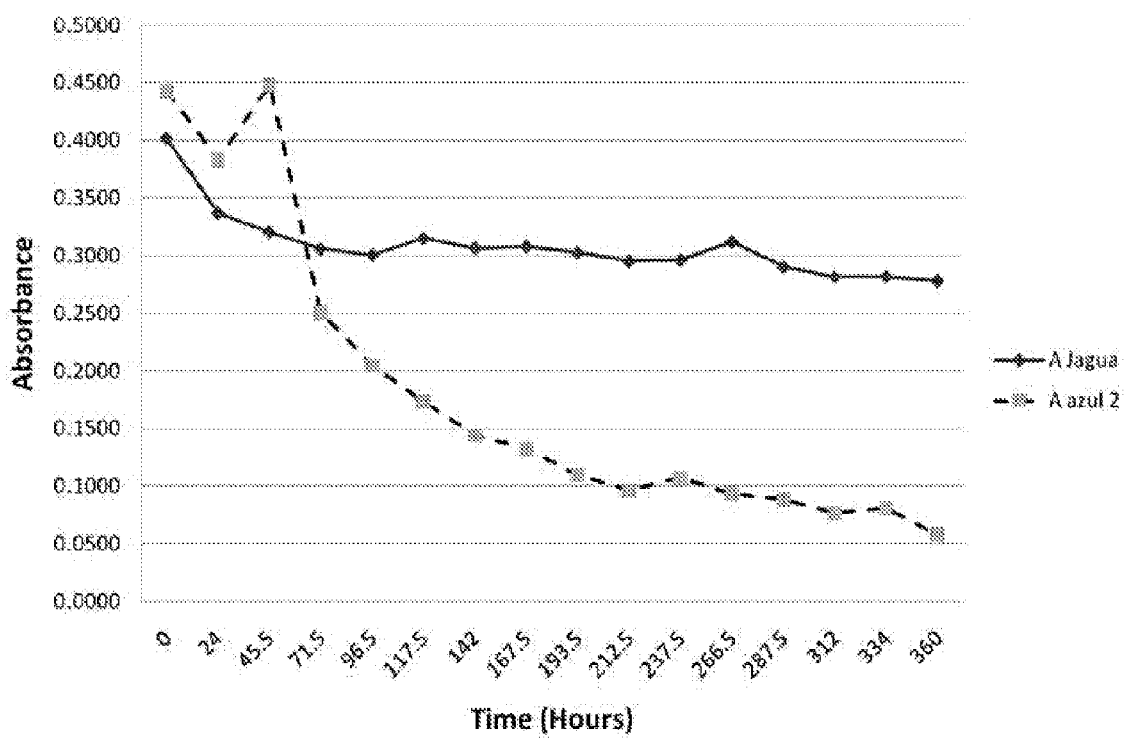
FIG. 11 shows a graphic comparing the absorbance in relation to time of the blue colorant of the present application (A-Jagua), and the absorbance in relation to time of the Blue 2 dye (Azul-2), when the temperature is 50° C. and the pH is 3.
Figure 12:
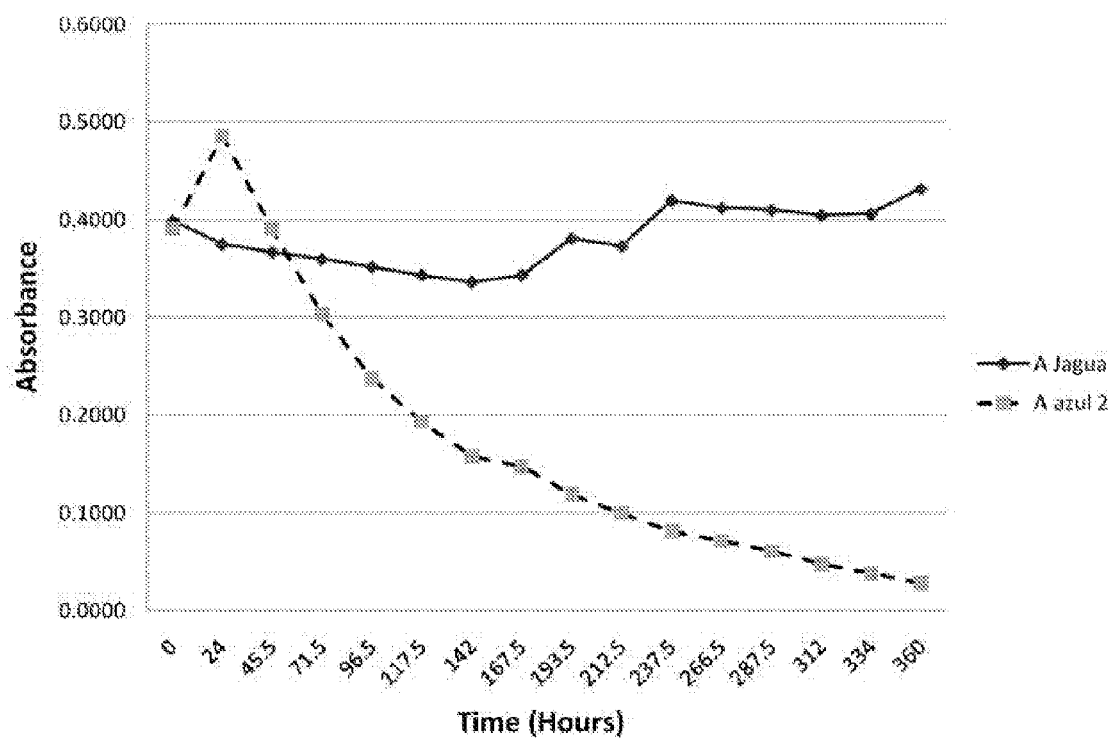
FIG. 12 shows a graphic comparing the absorbance in relation to time of the blue colorant of the present application (A-Jagua), and the absorbance in relation to time of the Blue 2 dye (Azul-2), when the temperature is 50° C. and the pH is 5.
Figure 13:
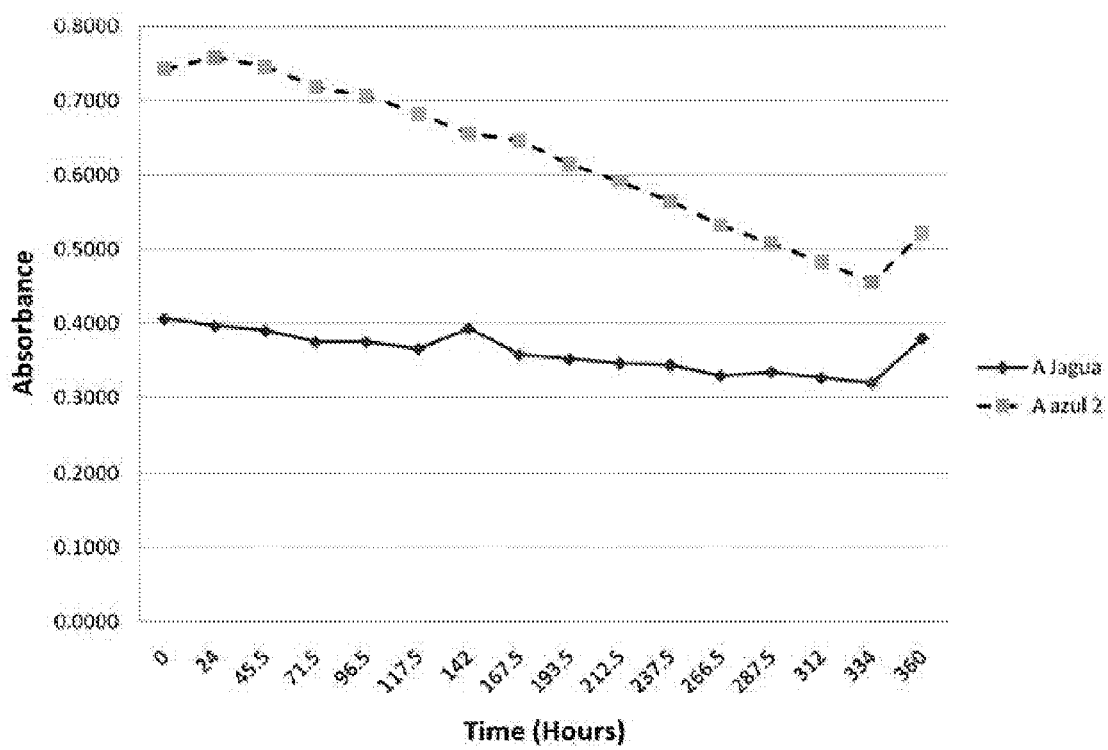
FIG. 13 shows a graphic comparing the absorbance in relation to time of the blue colorant of the present application (A-Jagua), and the absorbance in relation to time of the Blue 2 dye (Azul-2), when the temperature is 50° C. and the pH is 7.
Figure 14:
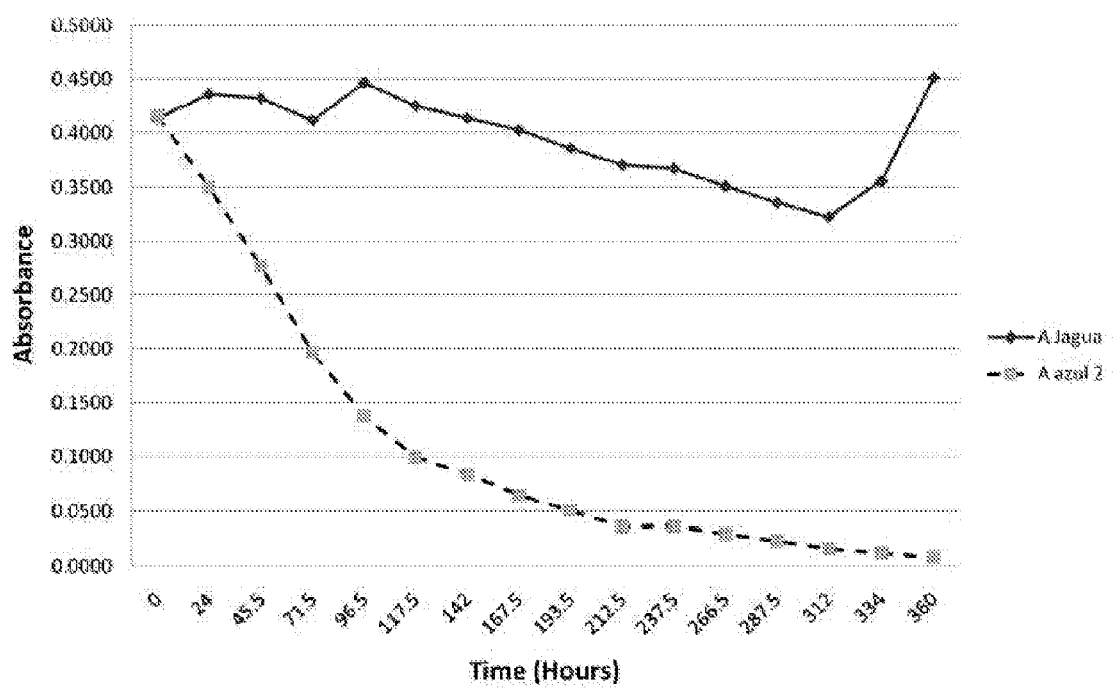
FIG. 14 shows a graphic comparing the absorbance in relation to time of the blue colorant of the present application (A-Jagua), and the absorbance in relation to time of the Blue 2 dye (Azul-2), when the temperature is 50° C. and the pH is 9.
Figure 15:
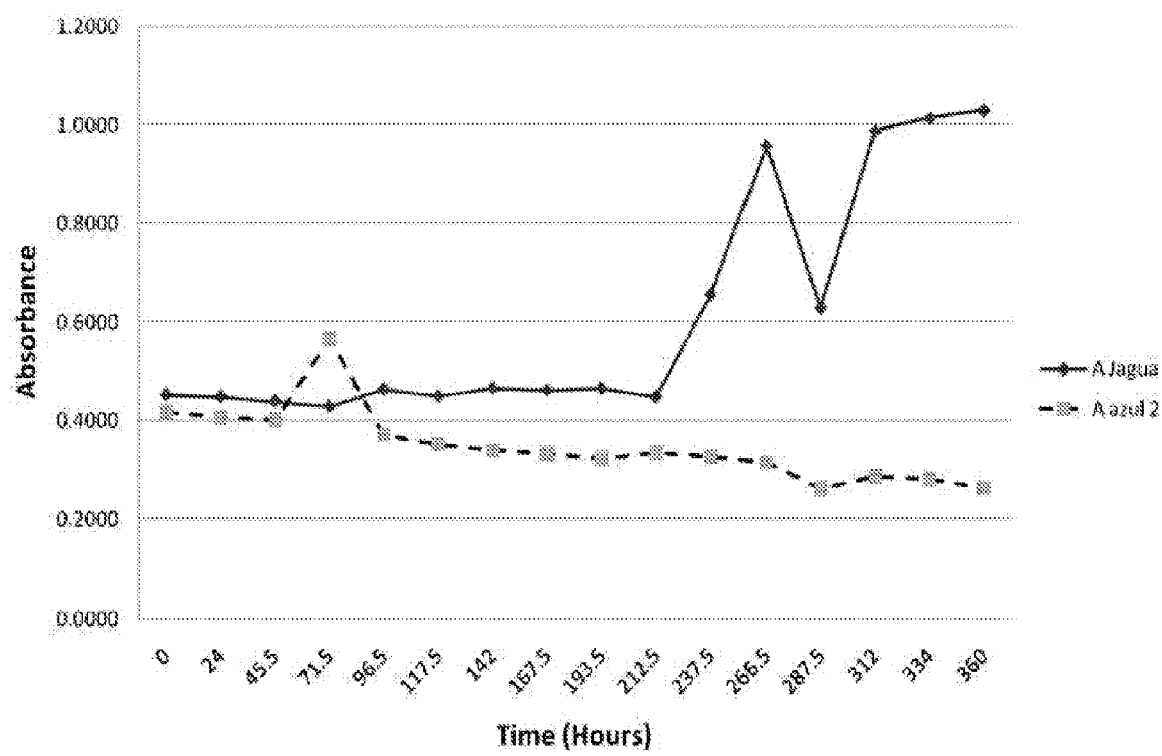
FIG. 15 shows a graphic comparing the absorbance in relation to time of the blue colorant of the present application (A-Jagua), and the absorbance in relation to time of the Blue 2 dye (Azul-2), when the temperature is 50° C. and the pH is 7.17.

Results of said testing can be observed in the graphics of FIGS. 1 to 15.

The invention claimed is:

1. A method of manufacturing a colorant pH-stable blue comprising:
A. Peeling off a *Genipa americana* fruit from its skin, wherein said skin is discarded, and wherein said fruit without skin is *Genipa americana* fruit pulp;
B. Obtaining raw liquid juice from the *Genipa americana* fruit pulp;
C. Mixing the raw liquid juice with glycine; and,
D. Warming up the raw liquid juice mixed with glycine for a determined period of time.

2. The method of claim 1, wherein obtaining the raw liquid juice from the *Genipa americana* skinless fruit comprises:
a. Grinding the *Genipa americana* fruit pulp;
b. Compressing the grinded *Genipa americana* fruit pulp against a mesh, wherein major solids are retained by said mesh, and wherein raw liquid juice goes throughout said mesh.

3. The method of claim 1, wherein mixing the raw liquid juice with glycine comprises mixing at least 0.2 grams of glycine per 100 milliliters of raw liquid juice.

4. The method of claim 3, wherein mixing the raw liquid juice with glycine comprises mixing between 0.2 grams and 1.6 grams of glycine per 100 milliliters of raw liquid juice.

5. The method of claim 1, wherein said method further comprises:

E. Adding starch to the previously warmed up mix of the raw liquid juice-glycine, and remixing, wherein said remixing results in an raw liquid juice-glycine-starch remix;

F. Dehydrating the raw liquid juice-glycine-starch remix, wherein dehydrating said remix comprises injecting the remix into a heated chamber by way of an atomizer; wherein the atomizer has the effect of converting the remix into small liquid remix droplets, wherein the chamber heat vaporizes water from said droplets, wherein vaporizing the water from said droplets results in low density particles and high density particles, wherein the high density particles precipitate to the chamber bottom and wherein the low density particles are aspirated with a vacuum, and wherein the aspirated low density particles form dried colorant powder.

6. The method of claim 1, wherein said method further comprises:

e. Adding starch to the previously warmed up mix of the raw liquid juice-glycine, and remixing, wherein said remixing results in an raw liquid juice-glycine-starch remix;

f. Dehydrating the raw liquid juice-glycine-starch remix to form a powder.

7. The method of claim 6, wherein said dehydrating comprises lyophilization.

8. A pH-stable blue liquid colorant prepared by the method of claim 1.

9. The liquid colorant of claim 8, wherein the mix of raw liquid juice and glycine comprises at least 0.2 grams of glycine per 100 milliliters of raw liquid juice.

10. The liquid colorant of claim 9, wherein the mix of raw liquid juice and glycine comprises between 0.2 grams and 1.6 grams of glycine per 100 milliliters of raw liquid juice.

11. A pH-stable blue powder colorant prepared by the method of claim 6.

12. The powder colorant of claim 11, wherein the dehydrated mix is derived from a premix of raw liquid juice and glycine, wherein said premix comprises at least 0.2 grams of glycine per 100 milliliters of raw liquid juice.

13. The powder colorant of claim 12, wherein the dehydrated mix is derived from a premix of raw liquid juice and glycine, wherein said premix comprises between 0.2 grams and 1.6 grams of glycine per 100 milliliters of raw liquid juice.

* * * * *

UNITED STATES PATENT AND TRADEMARK OFFICE
CERTIFICATE OF CORRECTION

PATENT NO. : 7,927,637 B2  
APPLICATION NO. : 12/245367  
DATED : April 19, 2011  
INVENTOR(S) : Echeverri et al.

Page 1 of 1

It is certified that error appears in the above-identified patent and that said Letters Patent is hereby corrected as shown below:

Title Page, Item 75, inventor "Luis Fernando Echeverry" should read --Luis Fernando Echeverri--.

Signed and Sealed this  
Sixth Day of August, 2013

Teresa Stanek Rea  
*Acting Director of the United States Patent and Trademark Office*